US010282195B2

(12) United States Patent
Mencias et al.

(10) Patent No.: US 10,282,195 B2
(45) Date of Patent: *May 7, 2019

(54) GENERATING AND APPLYING PATCHES TO COMPUTER PROGRAM CODE CONCURRENTLY WITH ITS EXECUTION

(71) Applicant: INTERNATIONAL BUSINESS MACHINES CORPORATION, Armonk, NY (US)

(72) Inventors: Angel Nunez Mencias, Stuttgart (DE); Albert Schirmer, Dettenhausen (DE); Christine Axnix, Dettenhausen (DE); Stefan Usenbinz, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/828,006

(22) Filed: Nov. 30, 2017

(65) Prior Publication Data
US 2018/0088934 A1 Mar. 29, 2018

Related U.S. Application Data

(63) Continuation of application No. 15/169,433, filed on May 31, 2016, now Pat. No. 9,904,539, which is a (Continued)

(30) Foreign Application Priority Data

Jan. 23, 2008 (EP) ..................................... 08150537

(51) Int. Cl.
*G06F 9/44* (2018.01)
*G06F 8/656* (2018.01)
(Continued)

(52) U.S. Cl.
CPC .......... *G06F 8/656* (2018.02); *G06F 9/44557* (2013.01); *G06F 9/50* (2013.01)

(58) Field of Classification Search
CPC ...................... G06F 8/60–8/78; G06F 9/44557
(Continued)

(56) References Cited

U.S. PATENT DOCUMENTS 5,321,844 A 6/1994 Schwagmann
5,481,713 A 1/1996 Wetmore et al.
(Continued)

FOREIGN PATENT DOCUMENTS

EP 0492251 A2 7/1992
EP 0757314 A1 2/1997

OTHER PUBLICATIONS

Thread-Local Storage Extension to Support Thread-Based MPI/OpenMP Applications; Patrick Carribault, Marc P'erache, and Herv' e Jourdren—CEA, DAM, DIF, F-91297 Arpajon, France; IWOMP 2011.*

(Continued)

*Primary Examiner* — Francisco J Aponte
(74) *Attorney, Agent, or Firm* — The Steadman Law Firm PLLC

(57) ABSTRACT

Techniques are disclosed for concurrently loading a plurality of new modules while code of a plurality of modules of an original computer program is loaded and executed on a computer system. An associated method may include allocating a module thread local storage (TLS) block for each thread within an initial computer program, wherein the allocated module TLS blocks are large enough to hold all module thread variables that are loaded or to be loaded. The method further may include reserving spare areas between the module TLS blocks for adding new module thread variables and arranging at an end of the module TLS blocks (Continued)

a thread data template section for resetting threads or creating new threads. The method may result in addition of modules to the original computer program and/or application of a concurrent patch through replacement of one or more of the plurality of original computer program modules.

20 Claims, 9 Drawing Sheets

Related U.S. Application Data continuation of application No. 14/456,336, filed on Aug. 11, 2014, now Pat. No. 9,436,457, which is a continuation of application No. 12/357,067, filed on Jan. 21, 2009, now Pat. No. 8,839,225.

(51) Int. Cl.
*G06F 9/445* (2018.01)
*G06F 9/50* (2006.01)

(58) Field of Classification Search
USPC .......................................... 717/165, 168–178
See application file for complete search history.

(56) References Cited

U.S. PATENT DOCUMENTS

| | | | |
|---|---|---|---|
| 5,805,887 A | 9/1998 | Wang | |
| 5,938,766 A | 8/1999 | Anderson et al. | |
| 5,953,530 A | 9/1999 | Rishi et al. | |
| 6,058,460 A | 5/2000 | Nakhimovsky | |
| 6,189,145 B1 | 2/2001 | Bellin et al. | |
| 6,298,434 B1 | 10/2001 | Lindwer | |
| 6,317,816 B1 | 11/2001 | Loen | |
| 6,360,233 B1 | 3/2002 | Houldsworth | |
| 6,446,188 B1 | 9/2002 | Henderson et al. | |
| 6,675,261 B2 * | 1/2004 | Shandony | G06F 17/30902 707/E17.005 |
| 6,751,794 B1 | 6/2004 | McCaleb et al. | |
| 6,928,536 B2 | 8/2005 | Duesterwald et al. | |
| 7,035,989 B1 | 4/2006 | Hinker et al. | |
| 7,124,251 B2 | 10/2006 | Clark et al. | |
| 7,140,018 B1 | 11/2006 | Beatty et al. | |
| 7,159,216 B2 * | 1/2007 | McDonald | G06F 9/4881 718/100 |
| 7,233,335 B2 | 6/2007 | Moreton et al. | |
| 7,380,039 B2 | 5/2008 | Miloushev et al. | |
| 7,421,710 B2 | 9/2008 | Qi et al. | |
| 7,451,440 B2 | 11/2008 | Zweifel | |
| 7,640,418 B2 | 12/2009 | Lee et al. | |
| 7,784,044 B2 | 8/2010 | Buban et al. | |
| 7,844,962 B2 | 11/2010 | Alexandre et al. | |
| 7,913,243 B2 | 3/2011 | Axnix et al. | |
| 7,984,432 B2 | 7/2011 | Edlund | |
| 7,991,962 B2 * | 8/2011 | Finnie | G06F 9/5016 711/132 |
| 8,028,132 B2 * | 9/2011 | Widell | G06F 9/3851 711/150 |
| 8,079,035 B2 | 12/2011 | Hankins et al. | |
| 8,108,625 B1 | 1/2012 | Coon et al. | |
| 8,140,773 B2 | 3/2012 | Saha et al. | |
| 8,286,238 B2 | 10/2012 | Durham et al. | |
| 2002/0016878 A1 | 2/2002 | Flores | |
| 2002/0069399 A1 | 6/2002 | Miloushey et al. | |
| 2002/0069400 A1 | 6/2002 | Miloushev et al. | |
| 2002/0095453 A1 | 7/2002 | Steensgaard | |
| 2002/0104077 A1 | 8/2002 | Charnell et al. | |
| 2003/0084434 A1 | 5/2003 | Ren | |
| 2004/0015938 A1 | 1/2004 | Taylor | |
| 2004/0107416 A1 | 6/2004 | Buban et al. | |
| 2004/0237071 A1 | 11/2004 | Hollander et al. | |
| 2005/0086658 A1 | 4/2005 | Wilding et al. | |
| 2006/0242491 A1 | 10/2006 | Axnix et al. | |
| 2007/0006201 A1 | 1/2007 | Axnix et al. | |
| 2007/0150891 A1 | 6/2007 | Shapiro | |
| 2009/0113110 A1 | 4/2009 | Chen et al. | |
| 2009/0125882 A1 | 5/2009 | Frigo et al. | |
| 2009/0150616 A1 | 6/2009 | Finnie et al. | |

OTHER PUBLICATIONS

Drepper, Ulrich. "ELF Handling for Thread-Local Storage." Version 0.20, Feb. 8, 2003. Red Hat Inc. http://people.redhat.com/drepper/tls.pdf.

Cain et al. "Memory Ordering: A Value-Based Approach." Proceedings of the 31st Annual International Symposium on Computer Architecture (ISCA '04), Jun. 2004.

Costa, Glauber De Oliveira et al. "Speeding Up Thread-Local Storage Access in Dynamic Libraries in the ARM platform." Proceedings of the GCC Developer's Summit, Jun. 2006.

* cited by examiner

GENERATING AND APPLYING PATCHES TO COMPUTER PROGRAM CODE CONCURRENTLY WITH ITS EXECUTION

BACKGROUND

The various embodiments described herein relate to a method for generating and applying patches to computer program code concurrently with its execution on a computer system, a data processing system for executing such method, and a computer program product containing code to execute such method.

Computer users have long had a need for continuous, non-disrupted operation. Therefore, methods have been developed to modify and update computer programs concurrently with their execution with new code (a patch) that is loaded into the computer.

Typically, a computer program consists of various sections such as executable machine code, static data variables, and temporary data. The executable code may comprise various procedures that are called via their address in memory. A static data variable is kept valid in the same memory address during the entire execution of the program. In contrast, a temporary data variable (and its location in memory) is only valid during certain periods of the program execution (e.g., while a specific procedure executes).

A patch to computer program code replaces either parts of or the entire computer program code. Methods that replace only parts of computer program code are described, e.g., in U.S. Pat. No. 5,321,844, European Patent No. EP 0 492 251 B1, and European Patent No. EP 0 757 314 A1.

The main processor firmware in existing IBM® eServer® zSeries® systems may be patched concurrently so that the complete computer program code is replaced. Such method assumes that it is possible to replace the currently running code with new code at a time where the temporary data are irrelevant with respect to the program execution. The method permits preservation of the static variables and their content.

The concurrent patch operation is executed by a concurrent loader process that runs as a background task. The concurrent loader loads new computer program code (i.e., code load) into the computer system memory and prepares the code for execution. Once the loading and preparation is completed, the concurrent loader sets the computer program to be patched into a state where temporary data can be ignored during the concurrent patch operation. Finally, it switches from the original code to the new code in an atomic operation. This entire procedure is referred to as the application of a concurrent patch.

The preparation of the new program code for its execution consists in resolving and adapting all address references in the code load to the addresses of the memory section into which the code is loaded. This step performed by the concurrent loader is known as relocation. For generating the program code, a standard linker program may be used that does not need special knowledge about the concurrent patch procedure. Thus, the concurrent patch application is transparent to the programmer; there is no need to know how the concurrent patch application functions when implementing the program. In fact, there is no difference between a code load used for a concurrent patch application and a code load that can be loaded by a loader that is not a concurrent loader.

The format of the computer program code and the format of the code load used for a concurrent patch is the standard Executable and Linking Format (ELF). Any linker program that supports the ELF format may be used. A code load in the ELF format may be used for a concurrent patch, and it may be loaded by any compliant loader that supports the ELF format (not necessarily a concurrent loader).

Function pointers generated by a compiler cannot be handled transparently by a concurrent loader alone. Accordingly, an extension is necessary. A function pointer is an element of many high-level programming languages (e.g., C and C++) that may be used instead of a procedure name literal string in order to refer to a specific procedure. Function pointers allow algorithms to use procedures as manipulation objects.

Usually, function pointers are translated into the address of the referenced procedure by the programming language compiler. The content of a data variable may be a function pointer. Since static data variables are preserved during the concurrent patch application, static data variables containing the address of a procedure are preserved as well. However, there is no guarantee that the address of the referenced procedure is still the same after the concurrent patch application. Between the assignment of an address of a procedure to a function pointer and the actual usage of the function pointer, one or more concurrent patch operations could have changed the address of the procedure. Thus, the function pointer does not necessarily point to the correct address of a procedure after application of a concurrent patch.

An address points to a memory location but does not provide any additional information, and the content stored in such memory location cannot be identified to be the address of a procedure, a data variable, a pure number, or even an instruction of the processor. A procedure is translated into a sequence of processor instructions by the compiler. A given sequence of processor instructions cannot be related to a procedure later on.

U.S. Pat. No. 5,481,713 and U.S. Pat. No. 5,938,766 disclose non-concurrent patch methods for replacing only parts of computer program code. These methods support function pointers. The function pointers are stored in a special memory area called a vector table. The vector table is maintained by a loader program that is responsible for the patch application.

The background of applying patches to a computer program concurrently with its execution is disclosed in U.S. Publication No. 2006/0242491. A further development of this method is disclosed in U.S. Publication No. 2007/0006201, which provides a method and a system for generating and applying a monolithic concurrent patch. Full support for function pointers is provided that is transparent to the programmer and nearly transparent to the concurrent loader. A reference to a function pointer is translated into a sequence of processor instructions called a function descriptor instead of translating it into an address. The purpose of the function descriptor is to jump to the memory location of the sequence of instructions generated by the compiler for the procedure referenced by the function pointer. The function descriptor is masked as a static data variable and therefore preserved during the application of a concurrent patch. The address of the jump to the procedure is updated by the regular relocation process during application of a concurrent patch.

However, the method described by U.S. Publication No. 2007/0006201 does not describe a method to allow a safe removal of function pointers within a concurrent patch. Thus, it is not possible to apply a concurrent patch with a code load via the method described by this publication in a scenario in which one or more of the functions pointers have been removed.

Moreover, known methods and systems do not allow application of a concurrent patch to a computer program that is organized in modules; rather, known methods and systems only allow application of a concurrent patch to one monolithic code load.

Furthermore, with known methods and systems, it is not possible to change the size of existing variables. Rather, known methods and systems merely provide for the addition of new variables and the deletion of existing variables.

SUMMARY

It is an object of the various embodiments described herein to provide a method for generating and applying patches to a computer program concurrently with its execution that is improved over the prior art. Moreover, it is an object of the various embodiments to provide a corresponding data processing system and computer program product.

These objects are achieved by the features of the disclosed claims. The following description discloses various exemplary embodiments.

A method is disclosed for concurrently loading a plurality of new modules while code of a plurality of modules of an original (i.e., currently running) computer program is loaded and executed on a computer system. The disclosed method may comprise preparing a memory layout during system initialization. Preparing such memory layout may comprise allocating a module thread local storage (TLS) block for each thread within an initial computer program, wherein the allocated module TLS blocks are large enough to hold all module thread variables that are loaded or to be loaded. Preparing such memory layout further may comprise providing constant offsets between module TLS block pointers corresponding to the module TLS blocks and the module thread variables for all of the threads. The disclosed method may be used to add modules to the original computer program and/or to apply a concurrent patch by replacing one or more of the plurality of original computer program modules.

To add new modules to the original computer program, the disclosed method further may comprise loading the plurality of new modules by allocating memory dynamically.

To apply a concurrent patch, the disclosed method further may comprise loading the plurality of new modules by replacing one or more of the plurality of original computer program modules with the plurality of new modules. Such loading step for concurrent patching may comprise determining which of the plurality of modules of the original computer program are to be replaced by the plurality of new modules; initiating a dependency resolution process with respect to the modules to be replaced; for each of the modules to be replaced, copying sections of each of the plurality of modules to reserved memory sections of the computer system; for each of the modules to be replaced, relocating all symbols and adding new static data variables and their initialization routines; bringing the computer system into a state where temporary data are irrelevant; relocating a global data section; executing all initialization routines in the context of the code of the plurality of modules of the original computer program; switching from the code of the plurality of modules of the original computer program to new code reflecting the plurality of new modules; and executing all initialization routines in the context of the new code.

Furthermore, a dynamic unloading of modules may be implemented in the various embodiments in addition to the disclosed loading method.

This disclosure provides a concurrent patching solution superior to that provided in the prior art. Concurrent patching as provided in the prior art does not allow the loading of modules after the initial loading of the computer program. With such concurrent patching, a global offset table (GOT), which is an array of memory addresses as used by the processor units (PUs) of a computer system in order to access a word in memory, must be duplicated and adapted for each PU. However, each loadable module has its own GOT and loads its address in all of the public entry points (i.e., public functions which may be called from other modules). Thus, it is not possible with such concurrent patching to set the GOT address for each PU when there is more than one module. Accordingly, concurrent patching as provided in the prior art does not permit the loading of modules at various points in time.

The various embodiments describe how the TLS concept is used to overcome this prior art limitation. The various embodiments provide a memory layout that combines the advantages of a dynamic TLS model and an exec TLS model. Specifically, the TLS concept has been extended in the various embodiments to provide for the use of an exec TLS model (particularly the local-exec TLS model) with its speed advantages while allowing for the concurrent patching provided by a dynamic TLS model. Thus, the various embodiments provide a performance improvement over the TLS prior art and allow the replacement of one or more modules, optionally including the initially loaded computer program or modules thereof, concurrent with execution. Additionally, the various embodiments may provide resolution of dependencies among modules and a suitable concurrent loader infrastructure.

To further improve concurrent loader capabilities, the various embodiments provide a way to change the size of existing variables without pointers. Instead of keeping a pointer to heap allocated variables, the various embodiments extend the concurrent loader to relocate extended variables in memory and to adapt the code for accessing the new memory in a transparent and flexible way, even when the variable layout is changed.

Modular and encapsulated code promotes the usage of function pointers to avoid hard-coded call-backs. The various embodiments describe a way to detect when call-back functions are removed and to allow a safe removal of existing references to such functions. Failure to remove references to a removed function would lead to an error in the event that such function is called.

The various embodiments may be used for firmware but are not limited to firmware applications. The various embodiments also may be used for operating systems (e.g., Linux). For such systems, the concurrent loader may be adapted to use the memory layout described herein for concurrent patch replacement of modules running on such systems.

BRIEF DESCRIPTION OF THE DRAWINGS

The various embodiments described herein will be described in detail with reference to the following figures.

FIG. 5b provides the two modules loaded into the module memory layout of FIG. 5a.

Figure 1:
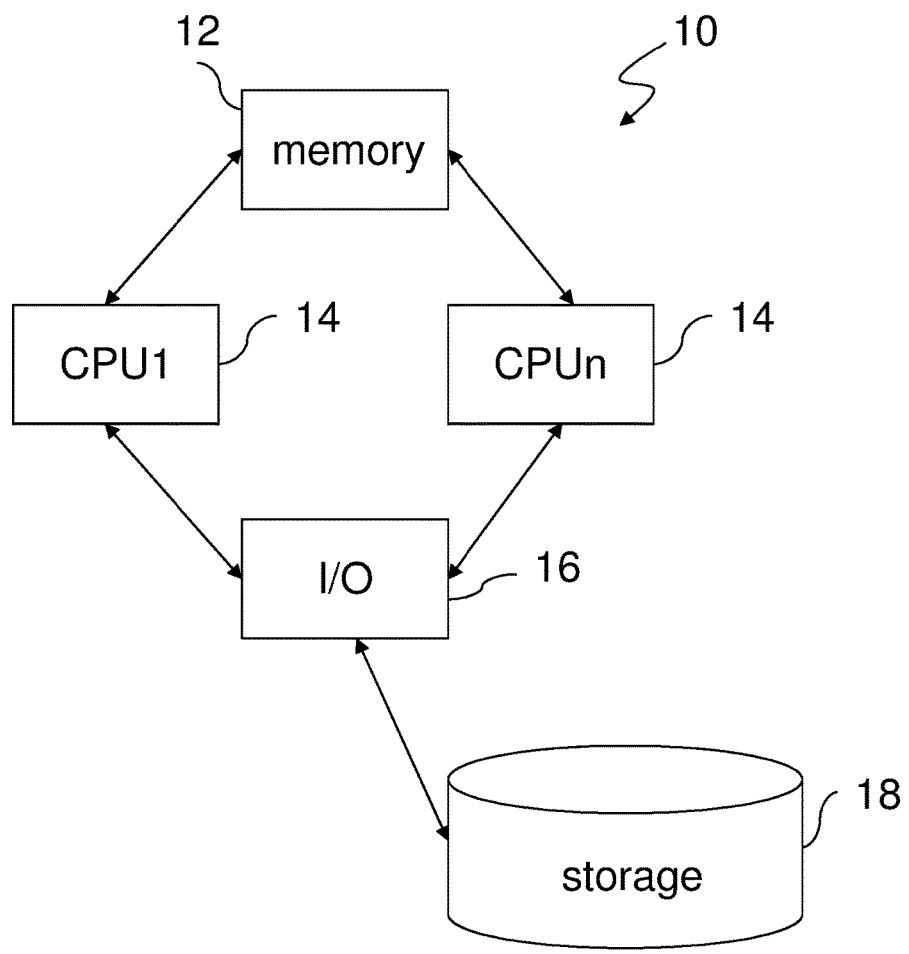
FIG. 1 provides a block diagram of a computer system in which an exemplary embodiment may be implemented.

In the drawings, like elements are referred to with equal reference numerals. The drawings are merely schematic representations and accordingly are not intended to portray specific parameters of the various embodiments. Moreover, the drawings are intended to depict only typical exemplary embodiments and therefore should not be considered as being limiting in scope.

DETAILED DESCRIPTION

FIG. 1 depicts a computer system 10 in which an exemplary embodiment may be implemented. A shared memory 12 may be coupled to one or more central processing units (CPUs) 14. The various CPUs may be represented as processor units (PUs) PU_0 . . . PU_n (see FIG. 2 herein). The CPUs 14 also may be coupled to an input/output (I/O) subsystem 16. A storage device 18 may be accessible to the CPUs 14 via the I/O subsystem 16. The memory 12 may be divided into memory words having a unique address used by the CPUs 14 to access their content.

The computer system 10 may execute multiple computer programs. This may be achieved by running an operating system kernel capable of supporting multitasking and/or multiprocessing. For the exemplary embodiment, it is sufficient that a simple dispatching program is present that is capable of distributing multiple work requests to the CPUs 14 and that can support different priorities. The dispatcher may choose the next work request from a queue of work requests based on the priorities of the requests in such queue. The work requests may be computer program code.

A computer program may be loaded on the computer system 10 by a normal or a concurrent program loader and may be implemented in a high-level programming language such as C or C++. The computer program code of such computer program then may be generated from the high-level language implementation via a compiler and a linker program. The output of such linker program is a position-independent code that needs to be translated to position-dependent code when the code is loaded into the memory 12. For example, the Executable and Linking Format (ELF) supports both variants.

The ELF Linux file format supports the concept of thread local storage (TLS) with the goal of defining a simple way to have different instances of data in each thread without the overhead of the posix thread library (pthreads), as described by Ulrich Drepper in "ELF Handling For Thread-Local Storage" (published at http://people.redhat.com/drepper/tls.pdf). The various embodiments described herein improve upon concepts which are disclosed in detail therein.

Each thread in a computer program uses the same code. Accordingly, while accessing a variable, each thread normally accesses the same memory address as the other threads. Threads are defined in terms of the different values of the processor registers. For instance, a current data access pointer has a different value for each thread. The TLS concept is based on using some of the processor registers to store a key with different values per thread and subsequently using these values to calculate the address of thread variable instances, wherein a thread variable is a variable with different values for each thread. For example, for the IBM zArchitecture, 32-bit access registers A0 and A1 are used for this task. Each of these registers is used to store half of a 64-bit memory address corresponding to the TLS memory block end. Each TLS block instance holds all of the thread variables. Each thread variable address may be calculated in the local-exec TLS model by adding a constant offset in the TLS block valid for all of the threads to the appropriate address in A0 and A1. The TLS model may be applied to the IBM System z firmware by considering each of the zSeries processors PU_0 . . . PU_n running a thread with firmware code.

It should be noted that a one-to-one relation between physical PU and execution thread is not necessary but rather merely describes the current particular situation in IBM System z firmware. Alternately (as is the case, e.g., for Linux), several threads per PU may be present. Since the various embodiments described herein are discussed with reference to IBM System z firmware, a one-to-one relation between physical PU and execution thread is assumed for purposes of the description herein (and thus periodic references are made to a "PU/thread" or "PUs/threads", reflecting such one-to-one relation). However, such assumption is merely by way of example and is in no way meant to limit implementation of the various embodiments to such one-to-one relation.

Concurrent patching as provided in the prior art duplicates the global offset table (GOT) for each PU to support different content for each processor variable. However, such concurrent patching cannot be used for loadable ELF modules, since each ELF module defines its own GOT. With prior art concurrent patching, a compiler generates code for each public function to load the module GOT address in a register (e.g., General Purpose Register R12 for IBM System z Linux). Since this code is the same for all of the PUs, it is not possible with prior art concurrent patching to load different values for the GOT of each PU. Thus, concurrent patching as provided in the prior art does not permit the loading of one or more modules after the loading of the initial computer program.

This prior art limitation may be overcome by using an extended TLS concept in accordance with the various embodiments described herein. Using such TLS concept, a more standard memory layout with a single GOT for each module may be provided while at the same time providing extended concurrent patching functionality that permits the loading of one or more modules after the loading of the initial computer program. The use of GOTs is optional with such TLS concept, and thus better performance is possible due to less instructions/memory accesses needed to obtain access to system global variables (which are variables that are shared across all PUs and thus exist only once per system).

Some known dynamic and exec TLS models are described by Drepper. Dynamic TLS models are used for modules that can get "dynamically" loaded after the initial executable file has started to run. When the loader allocates memory using this model for new module TLS blocks, it is not possible to make the TLS offset the same for each processor PU_0 . . . PU_n. Since the offsets are not constant and depend on the address assigned by the loader, the code generated by the compiler to access a thread variable calls a specific loader function (e.g., _tls_get_offset in IBM System z Linux) that is responsible for calculating and returning the offset of the variable for the current PU.

On the other hand, exec TLS models are used for modules that are loaded together with the initial executable file. For such modules, the loader can allocate consecutive memory for the module TLS blocks. Thus, the offsets between the addresses of the module thread variables and the module TLS block pointers (stored in A0 and A1) are the same for all of the PUs/threads. This allows the compiler to generate code to directly load the variable offsets without calling any loader helper function, thus making accesses significantly faster. However, despite better performance, the known exec models have a shortcoming in that they do not permit the loading of modules after the initial load. Conversely, the known dynamic models mentioned above may be loaded after the initial load, but they are slower because of the necessary loader helper function call. In sum, both the known dynamic TLS models and the known exec TLS models have key shortcomings.

The memory layout according to the various embodiments described herein provides an extended TLS concept that combines the advantages of the known dynamic TLS models and the known exec TLS models. Specifically, such memory layout allows use of the faster exec model (local-exec) and at the same time supports concurrent patching as provided by the dynamic model. The preparation of such memory layout may comprise allocating a module TLS block for each thread within an initial computer program, wherein the allocated module TLS blocks are large enough to hold all module thread variables that are loaded or to be loaded. Moreover, the preparation of such memory layout may comprise providing constant offsets between module TLS block pointers corresponding to the module TLS blocks and the module thread variables for all of the threads.

All of the module TLS blocks of such memory layout may be consecutive and have the same layout for each PU. Additionally, such memory layout also may allow concurrent addition of new thread variables to a module by providing spare areas (see "spare" portions in FIG. 2) between the module TLS blocks. Such spare areas may be used for the new thread variables. As shown by analysis, the amount of thread variables generally is small compared to the amount system global variables; the average size of a thread variable is several bytes. This means that the amount of reserved memory for thread variables need not be excessively large. Accordingly, the insertion of spare areas in the memory layout to make possible the addition of thread variables is a small price to pay for added benefits with respect to speed (by enabling use of the local-exec TLS model) and flexibility (by supporting dynamic loading of modules).

The preparation of such memory layout may be a key component of a method to concurrently load a plurality of new modules while code of a plurality of modules of an original (i.e., currently running) computer program is loaded and executed on a computer system. Such method may be used to add modules to the original computer program (see description herein with respect to FIGS. 4, 5a, and 5b). Moreover, such method may be used to apply a concurrent patch by replacing one or more of the plurality of original computer program modules (see description herein with respect to FIG. 6). Furthermore, a dynamic unloading of modules may be implemented in the various embodiments in addition to such method.

Figure 2:
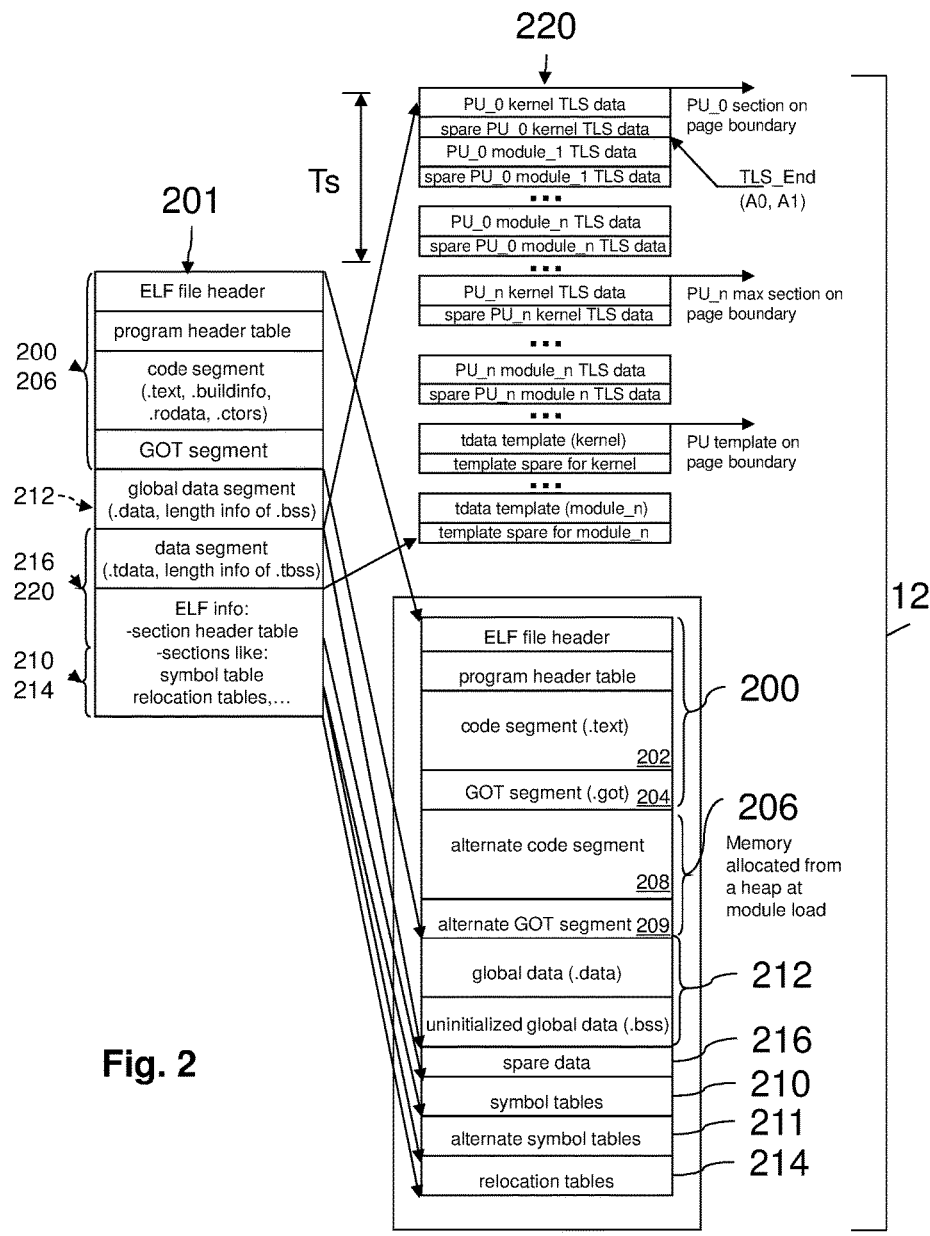
FIG. 2 provides a layout of the memory of the computer system of FIG. 1 and a module to be loaded into the memory in accordance with an exemplary embodiment.

FIG. 2 provides a layout of the memory 12 of the computer system 10 and a module (i.e., code load) 201 to be loaded into the memory 12 according to an exemplary embodiment. The computer program code depicts by way of example an ELF firmware executable file with a preferred TLS model. The module 201 may be used for concurrent patching and may be stored in the storage device 18. Only the area for the thread data (thread variables) of the module 201 is defined as pre-allocated memory. For the rest of the module 201, content memory is allocated dynamically at module load time. Additional memory space for an alternate code area, a GOT, and spare areas is prepared for concurrent patch support.

When a module within the computer program code is to be replaced (i.e., concurrent patching is to occur), all of the modules that use code of the replaced module have to be adapted at the same time, since the memory address of all of the referenced code changes. To make the change concurrent, all checking and code modification may be completed in the alternate code area. It is also possible to replace more than a single module concurrently, which allows the concurrent change of inter-module interfaces. When all of the required modules are prepared, all of the references are checked, and the code is relocated (e.g., in the background), then all PUs/threads may be synchronized and all of the new modules may be activated at the same time.

The layout of the memory 12, as illustrated in FIG. 2, may comprise a reserved section comprising computer program code 200 loaded in the memory 12. The computer program code 200 may comprise a segment of currently executed machine code 202 that may be executed by the CPUs 14 and a segment comprising its corresponding GOT 204. Another reserved section 206 may be used by a concurrent loader for the new code of a concurrent patch. More specifically, the section 206 may comprise a segment of new machine code (i.e., alternate code segment) 208 and a segment comprising its corresponding GOT (i.e., alternate GOT segment) 209. A reserved symbol tables section 210 may be used for symbol tables of the computer program code 200. A reserved alternate symbol tables section 211 may be used for symbol tables of the new code of a concurrent patch. Another reserved section 212 may be used for static system global data variables (e.g., uninitialized global data). Another reserved section 214 may be used for relocation tables. Another reserved section 216 may be space reserved for spare data (e.g., new system global variables). A reserved thread data section 220 may comprise PU-sections (i.e., module TLS blocks) used for module thread variables. The section 214 for the relocation tables may comprise a relocation table for the machine code 202, a relocation table for the GOT 204, a relocation table for the static system global data variables, and a relocation table for the module thread variables.

The content of the module (i.e., code load) 201 may comprise a section of machine code that may be loaded in the memory 12 and executed by the CPUs 14 and its corresponding GOT, a section for a symbol table, a section for static data variables, and a section for relocation tables. The content of a static data variable stored in the static data variable section may be initialized with a constant value that was known at the time the code load was created by a translation program from its sources; it may be initialized with reference to another static variable; or it may remain uninitialized. When such static data variable remains uninitialized, an initialization routine may be provided in the code section of the code load. If such a routine is not provided, then the static data variable needs to be initialized during the normal program execution. Among the relocation tables, there may be a relocation table for the machine code section, a relocation table for the GOT, a relocation table for the global data section, and a relocation table for the thread data section.

Figure 3:
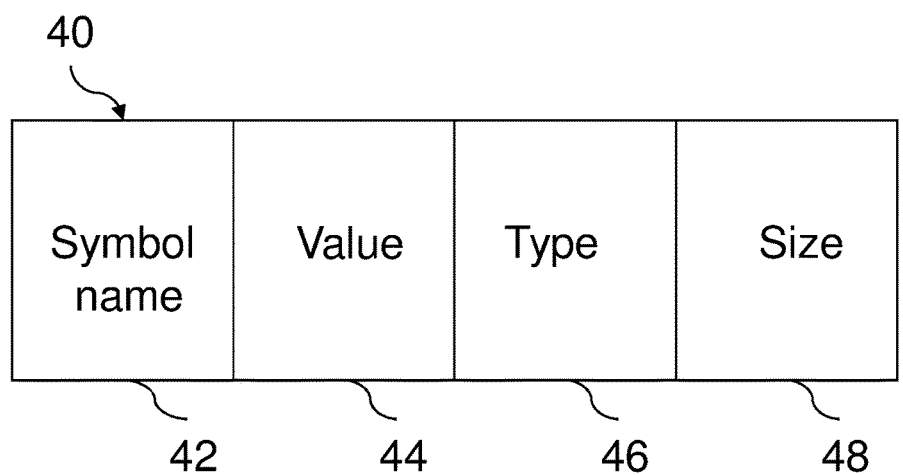
FIG. 3 provides a schematic representation of an entry of a symbol table as used in FIG. 2 in accordance with an exemplary embodiment.

The symbol tables in the symbol tables section 210 and in the alternate symbol tables section 211 may comprise listings of all of the procedures and the static variables of the computer program code 200 and the code load, respectively. Such listings may be implemented as, e.g., arrays. A symbol table entry 40 of a symbol table is shown in FIG. 3 (restricted to the characteristics important for the various embodiments described herein). It may comprise a symbol name 42, a value field 44, a type field 46, and a size (length) field 48. The symbol name 42 of a symbol entry 40 must be unique for each entry. The type field 46 may specify whether the symbol table entry 40 is associated with a procedure or a static data variable. The content of the value field 44 may be the memory address where the procedure or static data variable that is associated with the symbol table entry 40 is located in the computer memory 12. The size field 48 may permit determination of whether the size (e.g., the length) of a variable has changed.

Accesses from the computer program code 200 to the system global data variables may be either direct accesses, or, for position-independent code, indirect accesses via a GOT. An entry in the GOT may correspond to a symbol table entry in the symbol table. The relocation table for the GOT may specify a symbol table entry to which an entry in the GOT corresponds. For an indirect access of a static data variable via the GOT, the pointer to the static data variable may be obtained from the GOT.

Referring back to FIG. 2, the thread data section 220 containing the module thread variables will now be described in detail in accordance with an exemplary embodiment. The module layout may comprise consecutively arranged processor unit sections (PU-sections) (i.e., module TLS blocks) of equal size for each of n processor units PU_0 to PU_n. As is the case with IBM System z firmware, each thread of the computer program code 200 loaded in the memory 12 may be run on a separate PU. Each PU-section head with its kernel subsection may be placed on a page boundary of the memory 12. Each single PU-section may be subdivided into equally spaced subsections for each of n modules module_0 to module_n. Such modules may be, e.g., IBM System z firmware modules. Each of such subsections may comprise a module portion followed by a spare portion for additional module thread variables. Ts is the size of each PU-section, and each PU-section comprises n subsections corresponding to n modules. At the end of the PU-sections, a thread data template (i.e., tdata template) section of equal structure and size may be arranged. The thread data template section is needed to reset or create new threads.

As illustrated in FIG. 2, for the first processor PU_0, the first PU-section reserved in the memory 12 may comprise a kernel subsection with a module portion for TLS data of a module_0. The module_0 may comprise the initial computer program code. In addition to the TLS data of the module_0, the kernel subsection may comprise the concurrent loader to be used for loading new modules and for concurrent patching. The concurrent loader may be running as a background task on the computer system 10. The module portion for TLS data of the module_0 may be succeeded by a spare portion for thread variable expansions of module_0. These module and spare portions may be repeated consecutively for each module module_1 to module_n, yielding the section size Ts. Moreover, the thread data of the other processor units PU_1 through PU_n may be arranged according to the same structure and order. Due to such regular arrangement, the address of an object in another PU-section may be easily accessed if the address of an object in the first PU-section is known. Specifically, the address of an object in another PU-section may be obtained simply by starting from the page boundary address and adding an offset to the page boundary address.

Figure 4:
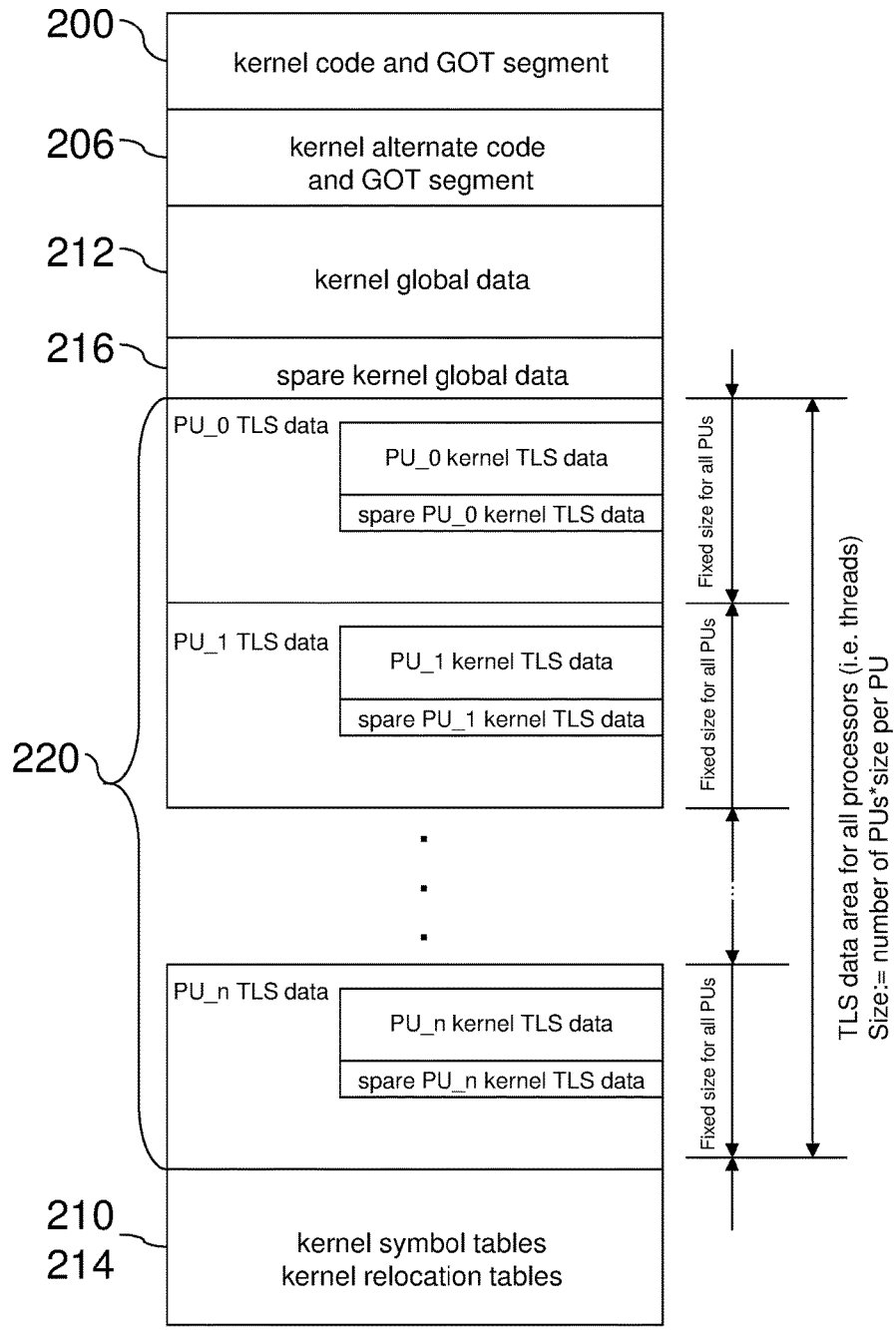
FIG. 4 provides a kernel memory layout in accordance with an exemplary embodiment.

The memory layout according to the exemplary embodiment described with respect to FIG. 2 is further illustrated in FIGS. 4 and 5. During system initialization, a concurrent loader may set up the memory structure of the system memory (also called the "Hardware System Area" (HSA)) that is required for exchanging firmware modules (e.g., IBM System z firmware modules) during normal system operation.

Much of the HSA layout is already defined in the IBM System z firmware linker script, in which the memory layout (starting address and length) of the code, GOT, global data, and TLS data segments are defined. This assures that the kernel segments within the System z firmware ELF file are already relocated correctly to the defined memory layout. For the TLS data segments, relocation may be done for the first processor (PU_0) only. The arrangement of the TLS data segments for all other processors may be done by the concurrent loader.

The concurrent loader may arrange the TLS data segments according to their designated addresses, as defined in the linker script. The TLS data segments for all PUs except for PU_0 may be created by copying the TLS data segment from PU_0 multiple times. More specifically, the TLS data segment may be copied from the module TLS block allocated for PU_0 to each of the module TLS blocks allocated for the other PUs. The target location for PU_n may be calculated by adding the PU addend to the TLS data segment address of PU_(n−1). The build process may place the PU addend value into the relevant symbol table, and accordingly the PU addend value may be fetched from the symbol table. The PU addend value may be generated by the linker script and defines the maximum size for the TLS data of each processor PU_0 . . . PU_n, as well as some reserve space for additional thread variables that may be added during concurrent patching. Thus, there may be TLS memory space allocated for all future modules to be loaded (provided that the planning is done correctly), and every processor PU_0 . . . PU_n may be allocated the same amount of memory for such future modules.

The relevant HSA memory layout is depicted in FIG. 4. Specifically, FIG. 4 illustrates a kernel memory layout after system initialization according to an exemplary embodiment. As reflected in FIG. 2, the memory layout may comprise a kernel section comprising the computer program code 200, a section 206 for alternate code (i.e., new machine code) and a corresponding alternate GOT, a section 212 for global kernel data, a section 216 for spare global data, and a thread data section 220 comprising PU-sections (i.e., module TLS blocks) for TLS data segments for all processors PU_0 . . . PU_n. In each PU-section, a TLS data portion may be followed by a spare portion. As previously mentioned, the section size Ts for each PU-section may be constant. The TLS data area for all processors PU_0 . . . PU_n (i.e., threads) is the number n of processors multiplied by the size per PU-section. By using the same TLS data size Ts for all processors PU_0 . . . PU_n, the addresses of the same data of the processors PU_1 . . . PU_n may be calculated quickly and easily through use of the addresses and offsets within the TLS data of PU_0.

The loading of a new firmware module (i.e., ELF file) may begin with dynamic allocation of memory for the new module. Every segment of the new module except the TLS data segment may be copied to its appropriate location in memory. However, address correction still must be done, because the addresses used by the linker are not valid because of dynamic allocation of the required memory. Therefore, these segments must be relocated by the concurrent loader before the code of the new module can be executed. As previously mentioned with reference to FIG. 2, the TLS data segment of the new module is handled differently; it is not copied to the dynamically allocated memory but rather is copied to the PU-sections allocated during system initialization. Each PU-section receives its own copy of the TLS data of the new module, so long as enough memory is available.

Figure 5A:
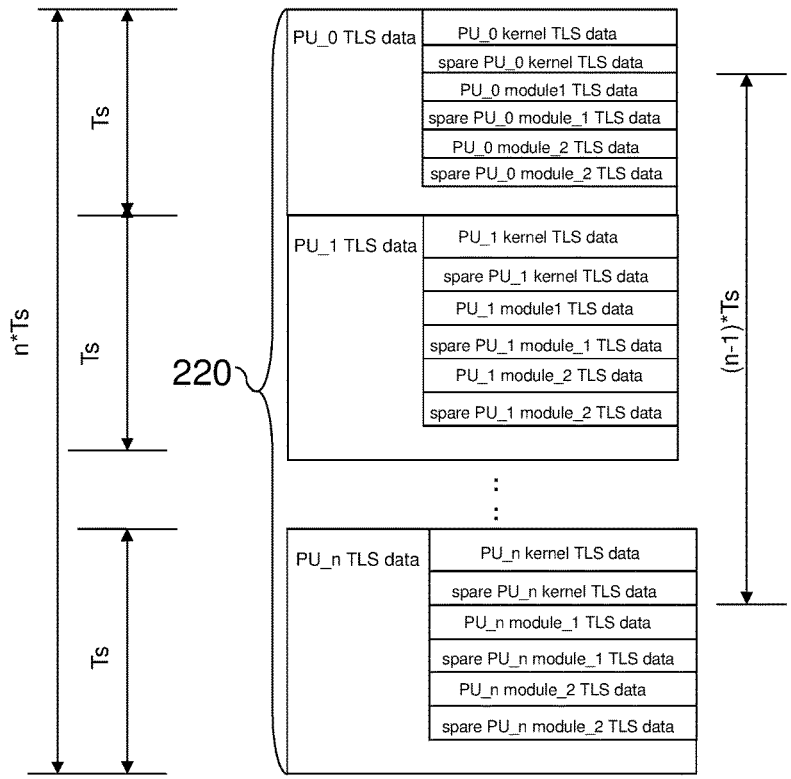
FIG. 5a provides a module memory layout with two modules loaded in accordance with an exemplary embodiment.
Figure 5B:
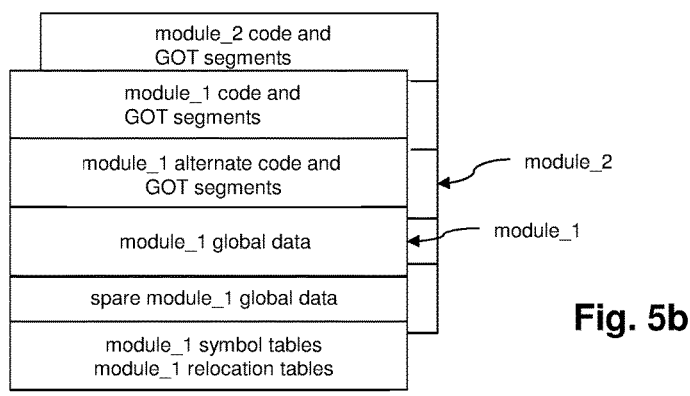

The layout of the resulting firmware structure in HSA memory is depicted in FIGS. 5a and 5b. FIG. 5a depicts the thread data section 220 with two modules, module_1 and module_2, loaded. The structures of module_1 and module_2 are provided in FIG. 5b.

Because the TLS data of loaded modules are copied at addresses subsequent to the kernel TLS data, the offsets for the TLS data of the loaded modules also have to be corrected by the concurrent loader (i.e., relocations are to be made by adapting all of the address references in the module code to the addresses of the TLS data in section 220).

To grant a loaded module access to kernel functions and/or functions of other modules, the concurrent loader must correct all of the corresponding references. During such correction it is determined whether there is any missing reference. Moreover, such correction allows recordation of the actually existing dependencies between modules. Furthermore, it is possible to determine whether the modules are loaded in correct sequence.

Figure 6:
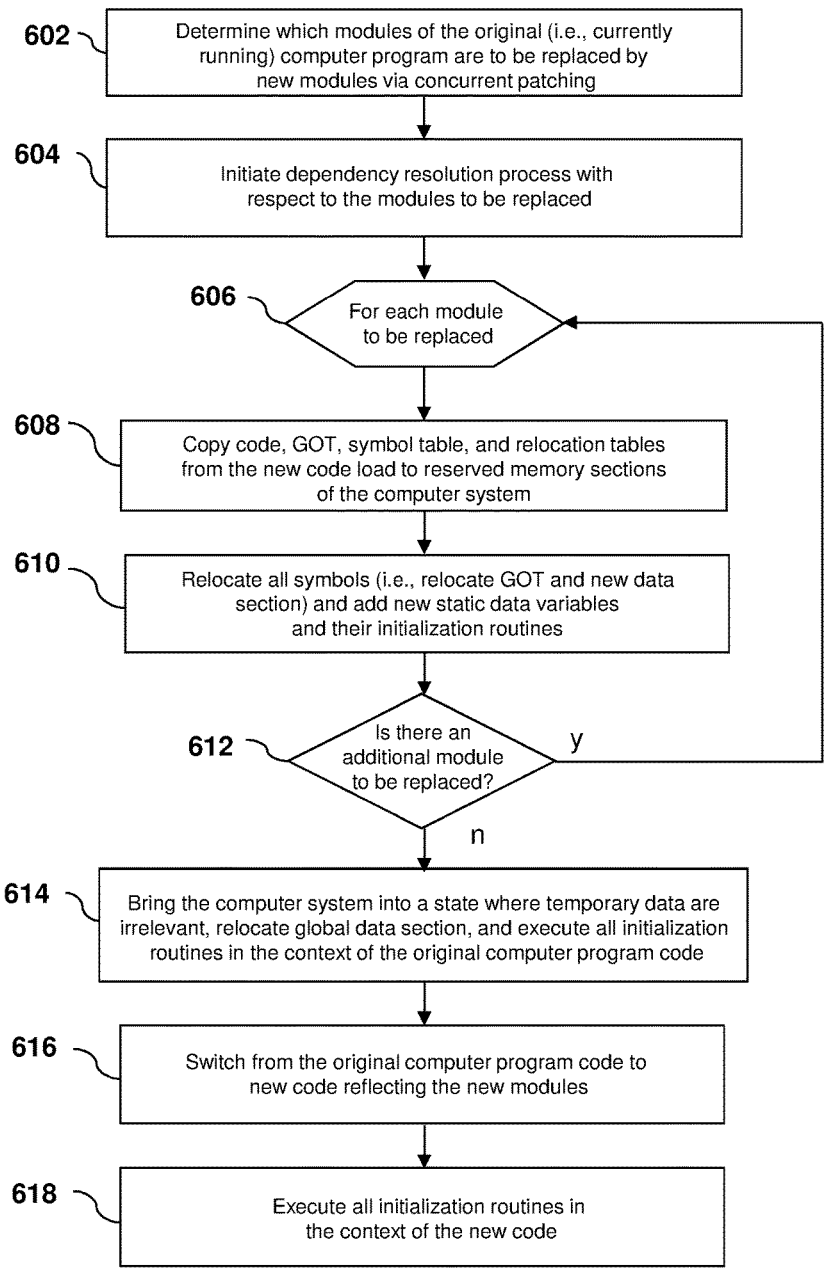
FIG. 6 provides a flow chart illustrating the steps performed by a concurrent loader when processing in accordance with an exemplary embodiment.

FIG. 6 provides a flow chart illustrating the steps that may be performed by a concurrent loader 600 when applying a concurrent patch.

In step 602, it may be determined which modules of the original (i.e., currently running) version of the computer program are to be replaced by new modules via concurrent patching.

Then, in step 604 a dependency resolution process for resolving module dependencies may be initiated with respect to the modules to be replaced. When a module is to be replaced, all of the modules that use code of the replaced module have to be adapted at the same time, since all of the referenced code changes. To make the change concurrent, all checking and code modification may be done in alternate code areas. It is also possible to replace more than a single module at the same time, which allows the concurrent change of inter-module interfaces. When all of the required modules are prepared, all of the references are checked, and the code is relocated (e.g., in the background), then all of the threads/processors may be synchronized and all of the new modules may be activated at the same time.

The dependency check of the dependency resolution may use two mechanisms:

(1) Formal dependencies: If a module_1 is loaded and subsequently a module_2 is loaded and activated, then module_2 may be concurrently replaced without affecting module_1. Replacement of module_1 would also require the replacement or the relocation of module_2. If a finer dependency is needed to reduce the number of relocated modules, the dependencies of each module may be encoded in the module.

(2) Relocations: If a module calls functions or accesses variables of other modules, a relocation is generated. The concurrent loader 600 may use such information to ensure that if the target of a relocation is moved in memory due to concurrent patching, then the module to which the relocation belongs is also flagged to be relocated.

Figure 8A:
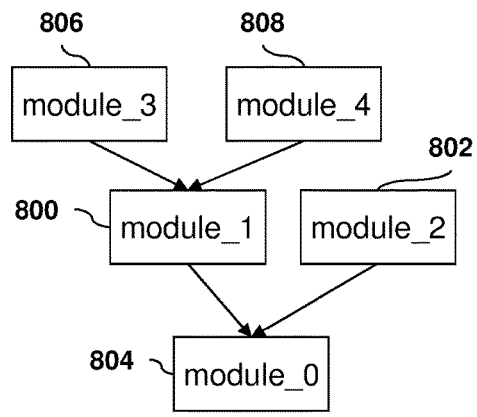
FIG. 8a provides an exemplary module dependency tree for purposes of dependency resolution.
Figure 8B:
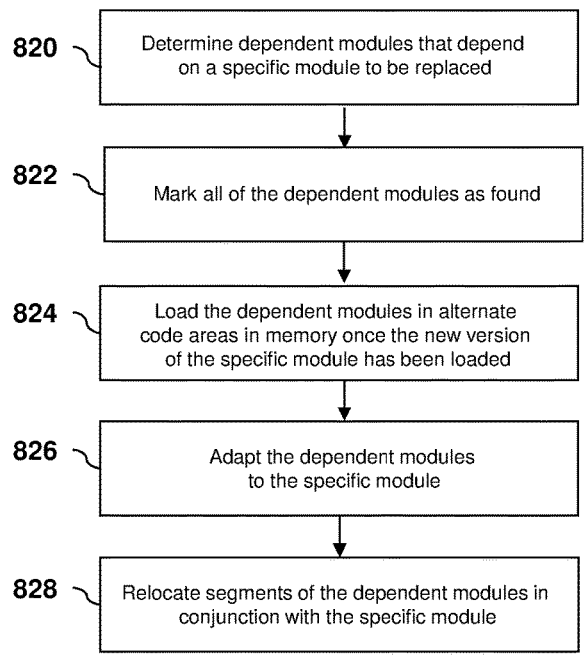
FIG. 8b provides a flow chart of a dependency resolution process in accordance with an exemplary embodiment.

A dependency resolution process according to an exemplary embodiment is further described herein with reference to FIGS. 8a and 8b.

For each module to be replaced (step 606) (e.g., module_0 . . . module_n in FIG. 2, steps 608 and 610 may be performed.

In step 608 the section of new machine code for the module being processed, including its GOT section, may be copied from the code load in the storage device 18 (i.e., the new code load) to the memory section reserved for the new machine code 208. As previously mentioned, FIG. 2 illustrates a section 206 that may comprise the new machine code 208 and its corresponding GOT 209. Moreover, in step 608 the symbol table of the new code load (i.e., the new symbol table) may be copied to the alternate symbol tables section 211 while preserving the original symbol table in the symbol tables section 210. Preserving the original symbol table is important, since the original symbol table is still in use by the original (i.e., currently running) computer program code 200. Furthermore, the original symbol table needs to be preserved to account for a scenario in which concurrent patching needs to be aborted.

In step 608, the previous relocation tables (in section 214 of FIG. 2) may be replaced with the relocation tables belonging to the new code load. This is possible since the original relocation tables are no longer needed for the execution of the original machine code 202; rather, the original relocation tables are needed only for the initial load of the original computer program code 200. The original relocation tables for the static system global data section 212 and the thread data section 220 also may be replaced, and then these sections may be adapted for consistency with the original layout of the system global section 212 and the thread data section 220. Such adaptation may comprise modifying the relocation offsets within the section. For example, if a relocation affects the second byte of a global variable called FOO, FOO is placed in the new code load at offset 20 in the global data section 212, and FOO had offset 15 in the global data section of the running code, then the relocation for FOO may be modified to point to the byte 16 instead of the byte 21. Such adaptation is required because the address and content of existing variables in sections 212 and 220 remain unchanged during concurrent patch so long as their size remains the same.

In step 610, each symbol table entry 40 (see FIG. 3) in the new symbol table of the new code load may be processed. This processing step is known as load-time relocation (see, e.g., U.S. Publication No. 2007/0006201).

If the symbol name 42 of the new symbol table entry 40 is found as a symbol name of a symbol table entry in the original symbol table, and if it is determined that the new symbol table entry is associated with a static system global data variable (i.e., it is not associated with a procedure or a thread variable), then the address as stored in the GOT 204 of the original machine code 202 is stored in the GOT 209 of the new machine code 208. The associated entries in each GOT may be found via the associated entries in the corresponding relocation table. The symbol address may be found by searching for the symbol name 42 in the original symbol table. Subsequently, the value field 44 of the new symbol table entry 40 may be updated such that it contains the correct memory address of the static data variable in the section 212 of static data variables. Then, the next new symbol table entry may be processed.

If it is determined that the new symbol table entry 40 being processed in step 610 is associated with a procedure, then the value field 44 of the new symbol table entry 40 may be updated so that it contains the correct memory address of the procedure referenced in the new machine code 208. Then, the next new symbol table entry may be processed.

If it is determined that the new symbol table entry 40 being processed in step 610 is associated with a thread variable, then the value field 44 of the new symbol table entry 40 may be updated so that it contains the address of the variable referenced in the original symbol table. Then, the next new symbol table entry may be processed.

If the symbol name 42 of the new symbol table entry 40 being processed in step 610 is not found in the original symbol table, then it is either associated with a new procedure or a new static data variable.

If it is determined that new symbol table entry 40 not found in the original symbol table is associated with a new static data variable, the concurrent loader 600 may add the new static data variable to the new data section 216 (i.e., spare data section) for new system global variables and to the appropriate spare area of section 220 for new thread variables. In order to complete such addition, the value field 44 of the new symbol table entry 40 is updated by the concurrent loader 600 such that it contains the correct memory address. Further, any entries in the GOT 209 of the new machine code 208 pointing to this new variable must be updated. The associated entries in the GOT 209 are found via the associated entries in the corresponding relocation table. The symbol address may be found by searching for the symbol name 42 in the updated new symbol table.

Subsequently, the concurrent loader 600 may search for an initialization routine for the new static data variable. According to an exemplary embodiment, such a routine may be identified in the new symbol table of the new code load via a unique naming convention for the symbol name of the associated entry in the symbol table. For example, a special prefix or postfix string for the symbol name may be used as an indicator. An initialization routine may be linked to the new code load such that it is contained in its code section. If an initialization routine is found in the new symbol table, then its address may be copied to a list called the 'init-routine-list', which may be stored in the section 216 for new system global variables by the concurrent loader 600.

After the search for an initialization routine is completed (and the new static data variable is added when available), the next new symbol table entry may be processed.

If it is determined that the new symbol table entry 40 not found in the original symbol table is associated with a new procedure, then the value field 44 of the new symbol table entry 40 is updated by the concurrent loader 600 such that it contains the correct memory address. Then, the next new symbol table entry may be processed.

Once steps 608 and 610 have been performed for all of the new symbol table entries of the new code load for the module being processed, then in step 612 it may be determined whether there is an additional module to be processed. If there is an additional module to be processed, then the process may proceed back to step 606.

If there is not an additional module to be processed, then in step 614 the concurrent loader 600 may bring the computer system 10 to a state where the temporary data (e.g., variables stored in the stack that are allocated as kernel thread variables) of the original computer program code 200 are no longer essential to the operation of the computer system 10.

Moreover, in step 614 the concurrent loader 600 may perform a relocation of the static system global data section 212. Such relocation cannot be performed as a background task, since the content of the data section 212 is used by the machine code section 202 during the execution of the original computer program code 200. Conversely, since the new GOT 209 and the new data section 216 are not in use by the machine code section 202, the relocation of the new GOT 209 and the new data section 216 performed in step 610 of FIG. 6 may be done as a background task in parallel to the execution of the original computer program code 200.

To achieve the relocation in step 614, the concurrent loader 600 may process each entry in the relocation table of the system global data section 212, the relocation table being stored in the relocation table section 214. During such processing, every reference from the data section to a procedure may be replaced by the updated address of the referenced procedure. Such relocation in step 614 functions similarly to the relocation performed in step 610.

By the additional relocation step, the additional indirection introduced by a function descriptor enables the regular relocation process to update the address of the procedure automatically during the application of the concurrent patch.

If an entry cannot be relocated, then in accordance with an exemplary embodiment the concurrent loader 600 may cancel the application of the concurrent patch.

Since the system global data section 212 is not affected by the relocation except to update the existing function descriptors, and the corresponding entries in the symbol tables section 210 are still available, the original static data variables and their content are preserved during the application of the concurrent patch.

Furthermore, in step 614 all initialization routines in the context of the original computer program code may be executed. Such initialization routines may comprise the $BACKOUT$ routine, which is described herein with reference to FIG. 7, and the $UNREGISTER$ routine, which is described herein with reference to FIG. 9.

Then, in step 616 the concurrent loader 600 may switch from the original computer program code running before application of the concurrent patch to new code reflecting the new modules loaded via concurrent patching.

Subsequently, in step 618 all initialization routines in the context of the new code may be executed. Such initialization routines may comprise the $MODIFY$ routine, which is described herein with reference to FIG. 7.

Figure 7:
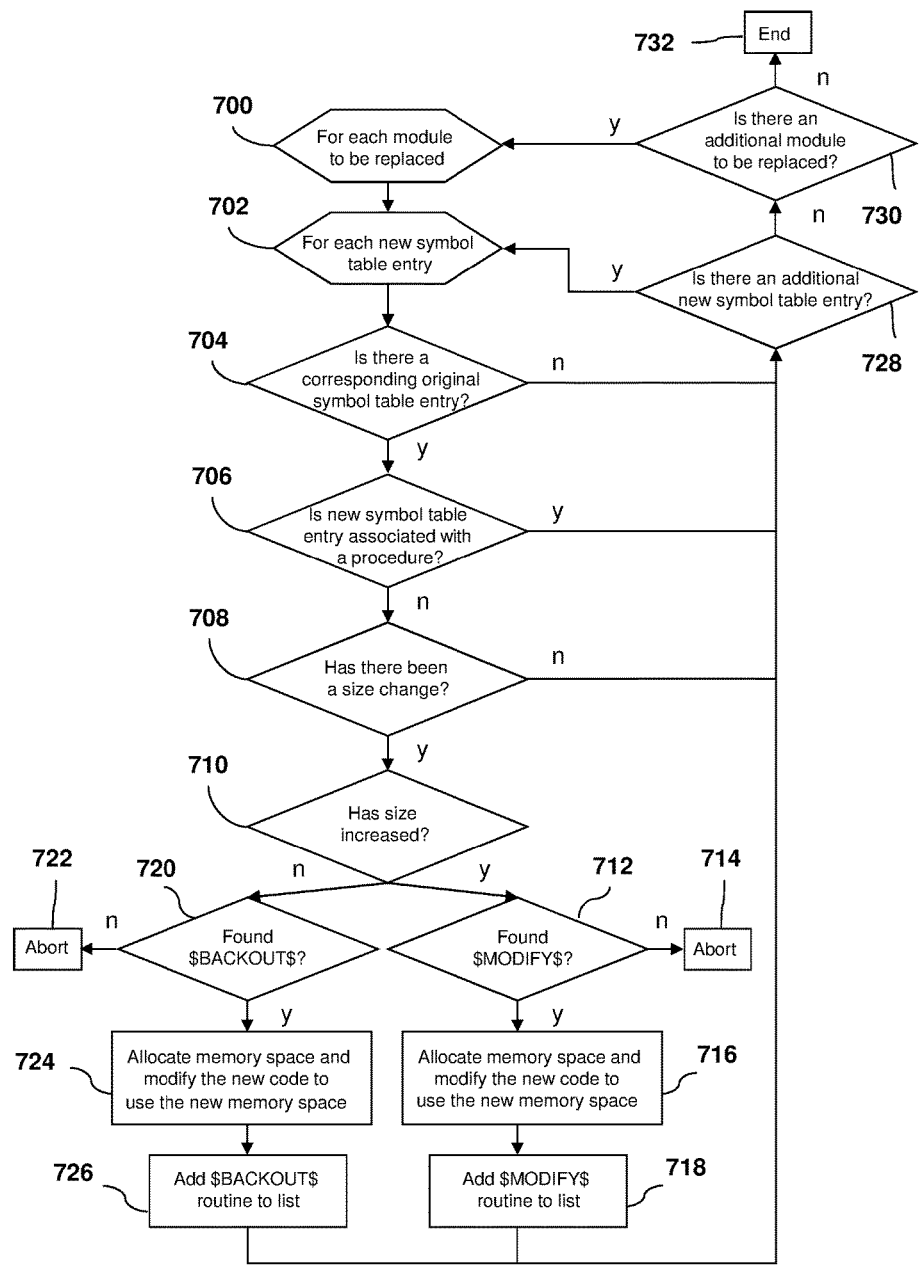
FIG. 7 provides a flow chart illustrating a process for accounting for size changes to existing static data structures in accordance with an exemplary embodiment.

FIG. 7 provides a flow chart illustrating a process for accounting for size changes to existing static data structures according to an exemplary embodiment. Such process may be implemented by the concurrent loader 600. Prior art concurrent loaders have no knowledge about the data layout and thus do not have the capability of copying data from an original static object (e.g., static data variable) to a new static object. Accordingly, prior art concurrent patching cancels execution in the event that such copying is necessary (e.g., when the size of a static data variable increases). According to an exemplary embodiment, an enlargement of static global variables is possible if the code owner also supplies corresponding transition routines to transform the data from an original object format to a new object format (and back again to account for the case where the patch has to be uninstalled). By way of example, IBM System z firmware code is used.

For all code changes resulting in a size increase of static variables, the concurrent loader may abort the concurrent patch execution if the corresponding transition routine is not found. For such static object enlargement, transition routines may be implemented to allow for concurrently installing or removing the patch. By way of example, the transition routines may be denoted $MODIFY$ and $BACKOUT$, wherein the former routine describes an increase in size and the latter routine describes a decrease in size.

As previously mentioned with reference to step 618 of the concurrent loading process illustrated in FIG. 6, the $MODIFY$ routine may be called once in the context of the new code. The $MODIFY$ routine may run on one processor if the modified static variable is part of the system global data that is present only once in the system or may be run on all of the processors if the modified variable has an instance for each thread/processor. The $MODIFY$ routine may receive the address of the original static variable as a parameter. It may be the responsibility of the routine to read the data from the original memory address and write such data into the new data structure.

The $BACKOUT$ routine may permit reversal of the concurrent static object enlargement and may be used to reverse a previous concurrent patch action (e.g., to return to a previous firmware version). As previously mentioned with reference to step 614 of the concurrent loading process illustrated in FIG. 6, the $BACKOUT$ routine may be called once in the context of running original computer program code (which in this case is the newer firmware version) before switching to the new code (which in this case is the previous firmware version). That is to say, the $BACKOUT$ routine may permit reversal of a concurrent patch action by enabling a switch back from a newer firmware version to a previous firmware version. The $BACKOUT$ routine may run on one processor for system global variables and on all processors for thread variables. The $BACKOUT$ routine may receive the address of the smaller (original) variable as a parameter. It may be the responsibility of the routine to take the content of the larger variable and to place it into the smaller variable. The content that does not exist in the smaller layout may be discarded.

The process illustrated in FIG. 7 may account for the scenario in which the code owner increases the size of an existing data object according to an exemplary embodiment. The code owner may implement the $MODIFY$ routine, which performs the transition for the data from the original layout to the new layout. As previously mentioned, during concurrent patching this routine gets passed the address of the data in the original layout so that the code may use the content of the original data to prepare the new data. The name of the routine may adhere to a fixed naming convention, wherein a prefix such as $MODIFY$ is used, followed by the affected variable name and the encoded original and new sizes. Such naming convention allows the concurrent loader to uniquely identify which routine is to be called, and accordingly any number of sequential size changes may be completed concurrently. The $MODIFY$ routine always copies data, even if only some data fields have been added at the end of the original structure. Such copying is necessary because the static variable with increased size is a different object in the new code with a different memory location.

Moreover, the process illustrated in FIG. 7 may account for the scenario in which the code owner provides a $BACKOUT$ routine, which performs the reverse transition to permit a concurrent fall-back from the new data layout to the original data layout. The name of the $BACKOUT$ routine may adhere to the same naming convention as the name of the $MODIFY$ routine, except that the starting pattern is $BACKOUT$ instead of $MODIFY$. As is the case with the $MODIFY$ routine, the $BACKOUT$ routine always copies data, even if only some data fields are added with the corresponding $MODIFY$, since the static variable gets a different memory location.

The process illustrated in FIG. 7 now will be described in detail. For each module to be replaced via concurrent patching (step 700), the new symbol table for such module may be examined by comparing the new symbol table entries with the entries of the original symbol table. For each new symbol table entry (step 702) in the new symbol table being examined, it may be determined in step 704 whether the new symbol table entry corresponds to a symbol table entry in the original symbol table. This may be determined by comparing the symbol name of the new symbol table entry with the symbol names of the symbol entries in the original symbol table. If the new symbol table entry does not correspond to a symbol table entry in the original symbol table, then the process may proceed to step 728 for further iteration. If the new symbol table entry does correspond to a symbol table entry in the original symbol table, then in step 706 it may be determined whether the new symbol table entry is associated with a procedure. If the new symbol table entry is associated with a procedure, then the process may proceed to step 728 for further iteration. If the new symbol table entry is not associated with a procedure but rather is associated with a static data variable, then in step 708 it may be determined whether the size (i.e., length) of the static data variable has changed. If the size of the static data variable has not changed, then the process may proceed to step 728 for further iteration. If the size of the static data variable has changed, then in step 710 it may be determined whether the size of the static data variable has increased.

If in step 710 it is determined that the size of the static data variable has increased, then in step 712 it may be determined whether the $MODIFY$ routine is provided by the user/programmer. If the $MODIFY$ routine is not found, then in step 714 the concurrent patch may be aborted. If the $MODIFY$ routine is found, then in step 716 new memory space for the static data variable may be allocated, and the new code may be modified to use the new memory space. Subsequently, in step 718 the $MODIFY$ routine may be added to the list of functions to be called just after switching to the new code and before any other code using the static data variable has run. Once the $MODIFY$ routine is added to the list of functions to be called, the process may proceed to step 728 for further iteration.

If in step 710 it is determined that that the size of the static data variable has not increased (i.e., has decreased), then in step 720 it may be determined whether the $BACKOUT$ routine is provided by the user/programmer. If the $BACKOUT$ routine is not found, then in step 722 the concurrent patch may be aborted. If the $BACKOUT$ routine is found, then in step 724 new memory space for the static data variable may be allocated, and the new code may be modified to use the new memory space. Subsequently, in step 726 the $BACKOUT$ routine may be added to the list of functions to be called just before switching back to the previous firmware version. It should be noted that the $BACKOUT$ routine may get passed the address of the new data structure (which is the data in the previous firmware version) so that the code can prepare the new data so that the previous firmware version may use it. Once the $BACKOUT$ routine is added to the list of functions to be called, the process may proceed to step 728 for further iteration.

In step 728, it may be determined whether there is an additional new symbol table entry to be processed in the new symbol table currently being examined. If there is an additional new symbol table entry to be processed, the process may proceed back to step 702. If there is not an additional new symbol table entry to be processed, then in step 730 it may be determined whether there is an additional module to be replaced via concurrent patching that needs to be processed. If there is an additional module to be processed, then the process may proceed back to step 700. If there is not an additional module to be processed, then the process may end (step 732).

Another enhancement is possible according to an exemplary embodiment. Replacing a modular program brings new challenges compared to a monolithic program. First, it is necessary to ensure that all of the dependencies between the modules are still fulfilled after the replacement. And second, it is necessary to support the simultaneous replacement of more than one module. The second requirement is necessary, for example, to allow changing interfaces between modules where the module providing the interface and its users have to be changed simultaneously.

In a modular system, each module may depend on other modules. For example, this occurs when a module (dependent module) calls functions or accesses variables defined by another module (dependency module). When such a scenario occurs, it is necessary to ensure that the dependency module is loaded and initialized before the dependent module may be used.

Accordingly, the concurrent loader must verify before loading a module that all of the dependency modules are loaded (top-down dependency). In modular systems with support for concurrent replacement, the concurrent loader also has to verify before replacing a module that the dependencies of other modules on the replaced module are also fulfilled (down-top dependency).

FIG. 8a depicts an exemplary dependency tree for purposes of dependency resolution. The module layout comprises modules 800, 802, 804, 806, 808 (module_0 . . . module_4). In this example, module 800 may be dependent upon module 804, and modules 806 and 808 may be dependent upon module 800. When module 800 is loaded, the loader only needs to ensure that all of the functions, variables, and constants from module 804 used by module 800 are present. For concurrent replacement of module 800, the loader also needs to ensure that the functions, variables, and constants from module 800 used by module 806 and module 808 are present in the new version of module 800.

A simultaneous replacement to account for the aforementioned dependencies could be done in the following imperfect way. When, for example, module 800 is replaced, the new version of its code could get different load addresses. Accordingly, after switching to the new code, if nothing is done, module 806 and module 808 would still use the previous version of module 800. This is not acceptable, since it would lead to different versions of module 800 running at the same time. Moreover, using this method it is necessary to repair the references to module 800 in module 806 and module 808. This is not trivial due to the concurrent aspect of the replacement; the system must continue running while the replacement is done, and thus it is not possible to stop module 806 and module 808 until their references have been fixed to account for the new version of module 800. Furthermore, if a problem were to arise at this moment (e.g., if a function in module 800 called by module 806 is no longer in the new version of module 800), then it would not be possible to undo the changes, and thus the system would be dysfunctional.

FIG. 8b provides a flow chart of a dependency resolution process according to an exemplary embodiment. This process provides that in the event that a specific module such as module 800 is concurrently replaced, the modules 806 and 808 depending on the specific module 800 also may be replaced. This process is referenced above with respect to step 604 of FIG. 6 and may be carried out by the concurrent loader 600. A design may be provided which allows for running most of such process in the background concurrent with the normal system execution. At the same time, it may be verified that the dependencies are fulfilled.

The dependency resolution process illustrated in FIG. 8 will now be described in further detail. When the specific module 800 is to be replaced, in step 820 the concurrent loader may find the dependent modules of the specific module 800, which as mentioned above are modules 806 and 808. This may be done based on the loading time (since everything loaded before module 800 cannot depend on module 800) or by using the relocations to find the actual dependencies. Then, in step 822 all of the found dependent modules (modules 806 and 808) may be marked so that they may be replaced together.

Subsequently, once the new version of the specific module 800 has been loaded, but before activation, in step 824 the concurrent loader may load the new versions of the dependent modules 806 and 808 in their respective alternate code areas. These may be the same modules 806 and 808 as the ones currently loaded or may be new ones.

Then, in step 826 the new versions of the dependent modules 806 and 808 may be adapted to use the new version of the specific module 800. If any of the dependencies cannot be resolved, the application of the concurrent patch still may be safely aborted, since the currently running modules have not yet been changed. Subsequently, in step 828 segments of the dependent modules 806 and 808 may be relocated in conjunction with the relocation of segments of the specific module 800.

It should be noted that if modules 806 or 808 are used by other modules, the concurrent loader may also replace such modules.

Once the concurrent loader has loaded and relocated all of the modules in the dependency tree, it may synchronize all threads and may make the very few changes that could not be done concurrently during the preparation phase (e.g., with respect to variables/function descriptors). Then, as described with reference to FIG. 6, the system may begin using the new code resulting from a successful concurrent patch, with all of the module dependencies resolved.

A further exemplary embodiment provides a way to safely account for function pointers using function descriptors such as those described by U.S. Pat. No. 5,938,766. Function pointers cannot be removed transparently by a concurrent loader alone, since the concurrent loader does not have a transparent way of determining whether the function pointer descriptor address is still stored in any data structure. The concurrent loader needs to ensure that all function pointer descriptor references are removed from the data structures before switching to the new code when an associated function no longer exists. Failing to remove any of the function pointer descriptor references pertaining to a removed function would lead to an execution error in the event that a function pointer for the removed function is used.

Figure 9:
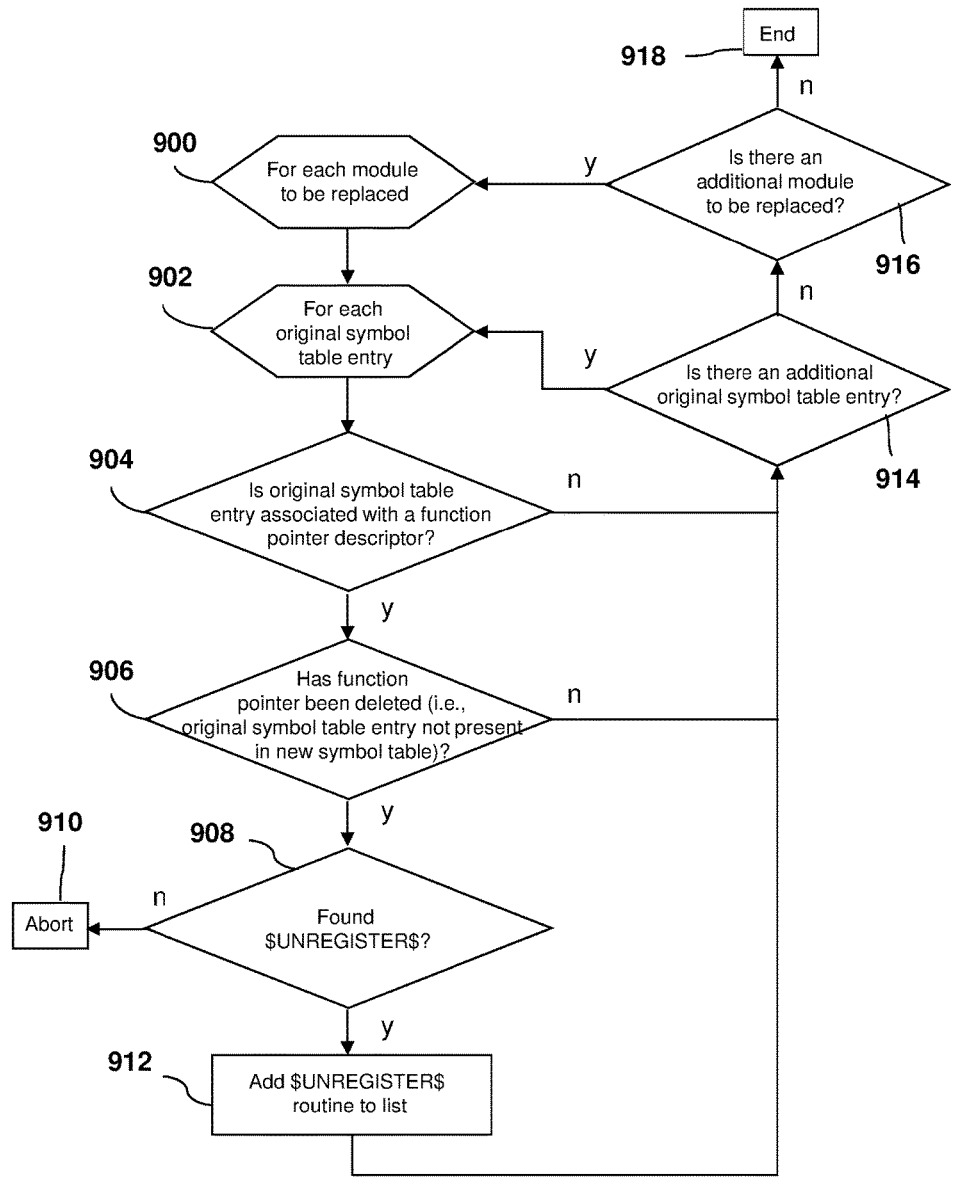
FIG. 9 provides a flow chart illustrating a process for safe deletion of function pointer references in accordance with an exemplary embodiment.

FIG. 9 provides a flow chart illustrating a process for safe deletion of function pointer references according to an exemplary embodiment. Such process may be implemented by the concurrent loader 600. Using such process, a concurrent loader may find removed function pointers via comparison and may properly account for them.

The process illustrated in FIG. 9 will now be described in detail. For each module to be replaced via concurrent patching (step 900), the original symbol table may be examined by comparing the original symbol table entries with the entries of the new symbol table for such module. For each original symbol table entry (step 902), it may be determined in step 904 whether the original symbol table entry is associated with a function pointer descriptor. If the original symbol table entry is not associated with a function pointer descriptor, then the process may proceed to step 914 for further iteration. If the original symbol table entry is associated with a function pointer descriptor, then in step 906 it may be determined whether the relevant function pointer has been deleted by determining whether the original symbol table entry is present in the new symbol table of the module currently being examined. If the original symbol table entry is present in the new symbol table, then the function pointer has not been deleted, and accordingly the process may proceed to step 914 for further iteration. If the original symbol table entry is not present in the new symbol table, then the function pointer has been deleted, and accordingly in step 908 the concurrent loader 600 may search for the $UNREGISTER$ routine, which is a special function that has a fixed naming convention and that corresponds to the deleted function pointer. This routine has to exist in the running context, i.e., the original symbol table. If the $UNREGISTER$ routine is not found, then in step 910 the concurrent patch may be aborted. If the $UNREGISTER$ routine is found, then in step 912 the $UNREGISTER$ routine may be added to the list of functions to be called just before switching to the new code. That is to say, as previously mentioned with reference to step 614 of the concurrent loading process illustrated in FIG. 6, the $UNREGISTER$ routine may be executed in the context of the original computer program code before switching to the new code. It should be noted that the new code usually is a previous version in which the function pointer is not present. Accordingly, the $UNREGISTER$ routine must be provided together with every new function pointer to allow a possible removal of the new firmware version. This $UNREGISTER$ routine may be responsible for the proper deletion of all function pointer references. Since the concurrent loader does not remove the function pointer references, it is the responsibility of the $UNREGISTER$ routine to do so. Once the $UNREGISTER$ routine is added to the list of functions to be called, the process may proceed to step 914 for further iteration.

In step 914, it may be determined whether there is an additional original symbol table entry to be compared with the entries of the new symbol table of the module currently being examined. If there is an additional original symbol table entry, then the process may proceed back to step 902. If there is no additional original symbol table entry, then in step 916 it may be determined whether there is an additional module to be replaced via concurrent patching that needs to be processed. If there is an additional module to be processed, then the process may proceed back to step 900. If there is not an additional module to be processed, then the process may end (step 918).

A scenario in which such functionality is required may best be described via example. For instance, a new function "Handler_SW47" is required for a new firmware version to be called for each occurrence of the arrival of a Service Word (firmware message) with number 47. The new function is implemented in the new firmware version, and the initialization code also contains a call to the component implementing the Service Word protocol to register Handler_SW47. During this registration, a function pointer to "Handler_SW47" is stored, which is called unconditionally when a Service Word 47 arrives. To support the removal of this new firmware version to concurrently switch back to a previous version of the firmware in which the Service Word 47 is not handled, another routine must also be available that allows removal of the Handler_SW47 function pointer from the Service Word protocol component before switching back to the previous firmware. Such routine may be named, e.g., "$UNREGISTER$Handler_SW47". Its implementation contains the call to unregister the new "Handler_SW47" with the Service Word protocol component. If this removal of the registration is not done, then any time after the switch back to the previous firmware version, the function pointer to "Handler_SW47" would be called upon the arrival of a Service Word 47. However, such function pointer call would be problematic, since the function no longer exists; accordingly, the system would be disrupted by a program error.

In sum, the code owner may remove a function that is associated with a function pointer. Moreover, the code owner may implement a routine (e.g., $UNREGISTER$) that assures that all function pointer references to such function are deleted. During concurrent patching, such routine may be called in the context of the original computer program code. Furthermore, to inform the concurrent loader that the procedure belongs to the deleted function pointer, the name of such routine may adhere to a fixed naming convention.

An existing linker program may be modified to implement the various embodiments described herein. Alternatively, a special program may be used to implement the various embodiments. Furthermore, the concurrent loader may be modified so that it may implement the various embodiments completely.

The various embodiments described herein are not limited to fixed pre-allocated memory areas for the new code, the symbol tables, the relocation tables, and temporary data. It is also possible to use dynamic memory allocation methods instead.

In addition, the various embodiments may be implemented in conjunction with computer program code 200 and a code load that do not make use of position-independent code. In such case, GOT relocation tables and GOTs are not necessary; instead, the references from code to data that need to be resolved may be listed in a code relocation table.

The various embodiments may assume the form of an entirely hardware embodiment, an entirely software embodiment, or an embodiment containing both hardware and software elements. The various embodiments may be implemented in software, which includes but is not limited to firmware, resident software, microcode, etc.

Furthermore, the various embodiments may assume the form of a computer program product accessible from a computer-usable or computer-readable medium providing program code for use by or in connection with a computer or any instruction execution system. For the purposes of this description, a computer-usable or computer-readable medium may be any apparatus that can contain, store, communicate, propagate, or transport the program for use by on in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read-only memory (CD-ROM), compact disk-read/write (CD-R/W), DVD, and Blu-ray.

A data processing system suitable for storing and/or executing program code may comprise at least one processor coupled directly or indirectly to memory elements through a system bus. The memory elements may comprise local memory employed during actual execution of the program code, bulk storage, and cache memories. The cache memories may provide temporary storage of at least some program code in order to reduce the number of times code must be retrieved from bulk storage during execution.

Input/output (I/O) devices (including but not limited to keyboards, displays, pointing devices, etc.) may be coupled to the system either directly of through intervening I/O controllers.

Network adapters also may be coupled to the system to enable the data processing system or remote printers or storage devices through intervening private or public networks. Modems, cable modems, and Ethernet cards are some of the currently available types of network adapters.

While particular exemplary embodiments have been shown and described, various modifications of the various embodiments described herein will be apparent to those skilled in the art, and such modifications fall within the scope of the disclosure.

The invention claimed is:

1. A method for applying a patch by concurrently loading a plurality of new modules while code of a plurality of modules of an original computer program is loaded and executed on a computer system, the method comprising:
   allocating a module thread local storage (TLS) block for each thread within an initial computer program, wherein the module TLS blocks are large enough to hold all module thread variables that are loaded or to be loaded, and wherein the module TLS blocks are allocated consecutively, with the same layout for each thread;
   reserving spare areas between the module TLS blocks for adding new module thread variables; and
   arranging at an end of the module TLS blocks a thread data template section for resetting threads or creating new threads.

2. The method of claim 1, further comprising loading the plurality of new modules by allocating memory dynamically.

3. The method of claim 2, further comprising relocating segments of the plurality of new modules via a concurrent loader before executing new code reflecting the plurality of new modules.

4. The method of claim 1, further comprising copying TLS data segment content to at least a portion of the module TLS blocks.

5. The method of claim 1, further comprising loading the plurality of new modules by replacing one or more of the plurality of modules of the original computer program with the plurality of new modules, wherein the loading step comprises:
   determining which of the plurality of modules of the original computer program are to be replaced by the plurality of new modules;
   initiating a dependency resolution process with respect to the modules to be replaced;
   for each of the modules to be replaced, copying sections of each of the plurality of new modules to reserved memory sections of the computer system;
   for each of the modules to be replaced, relocating all symbols and adding new static data variables and their initialization routines;
   upon determining that there is no additional module to be replaced, bringing the computer system into a state where temporary data are irrelevant, wherein the temporary data include variables stored in a stack that are allocated as kernel thread variables;
   relocating a global data section;
   executing all initialization routines in the context of the code of the plurality of modules of the original computer program;
   switching from the code of the plurality of modules of the original computer program to new code reflecting the plurality of new modules; and
   executing all initialization routines in the context of the new code.

6. The method of claim 5, further comprising comparing sizes of variables referenced in a symbol table of the original computer program with sizes of variables referenced in a new symbol table of each of the plurality of new modules.

7. The method of claim 6, further comprising determining whether a transition routine for enlarging variable size or a transition routine for decreasing variable size is provided.

8. The method of claim 6, further comprising allocating new memory space for variables increased in size or for variables decreased in size.

9. The method of claim 5, further comprising providing a process for safe deletion of function pointer references for functions that are removed as a result of the loading step.

10. The method of claim 5, wherein the dependency resolution process comprises:
    determining dependent modules that depend on a specific module to be replaced;
    marking all of the dependent modules as found;
    loading the dependent modules in alternate code areas;
    adapting the dependent modules to the specific module; and
    relocating segments of the dependent modules.

11. The method of claim 1, further comprising copying a TLS data segment from one module TLS block among the module TLS blocks to other module TLS blocks among the module TLS blocks.

12. The method of claim 1, further comprising providing constant offsets between module TLS block pointers corresponding to the module TLS blocks and the module thread variables for all of the threads.

13. A computer program product for applying a patch by concurrently loading a plurality of new modules while code of a plurality of modules of an original computer program is loaded and executed on a computer system, the computer program product comprising a non-transitory computer-readable medium having computer-readable program code instructions stored therein comprising:

instructions for allocating a module thread local storage (TLS) block for each thread within an initial computer program, wherein the allocated module TLS blocks are large enough to hold all module thread variables that are loaded or to be loaded, and wherein the module TLS blocks are allocated consecutively, with the same layout for each thread;

instructions for reserving spare areas between the module TLS blocks for adding new module thread variables; and instructions for arranging at an end of the module TLS blocks a thread data template section for resetting threads or creating new threads.

14. The computer program product of claim 13, wherein the computer-readable program code instructions further comprise instructions for loading the plurality of new modules by replacing one or more of the plurality of modules of the original computer program with the plurality of new modules, wherein the instructions for loading comprise:

instructions for determining which of the plurality of modules of the original computer program are to be replaced by the plurality of new modules;

instructions for initiating a dependency resolution process with respect to the modules to be replaced;

for each of the modules to be replaced, instructions for copying sections of each of the plurality of new modules to reserved memory sections of the computer system;

for each of the modules to be replaced, instructions for relocating all symbols and adding new static data variables and their initialization routines;

instructions for, upon determining that there is no additional module to be replaced, bringing the computer system into a state where temporary data are irrelevant, wherein the temporary data include variables stored in a stack that are allocated as kernel thread variables;

instructions for relocating a global data section;

instructions for executing all initialization routines in the context of the code of the plurality of modules of the original computer program;

instructions for switching from the code of the plurality of modules of the original computer program to new code reflecting the plurality of new modules; and instructions for executing all initialization routines in the context of the new code.

15. The computer program product of claim 13, wherein the computer-readable program code instructions further comprise instructions for copying a TLS data segment from one module TLS block among the module TLS blocks to other module TLS blocks among the module TLS blocks.

16. The computer program product of claim 13, wherein the computer-readable program code instructions further comprise instructions for providing constant offsets between module TLS block pointers corresponding to the module TLS blocks and the module thread variables for all of the threads.

17. A data processing system comprising:

a processor; and a memory storing a program, which, when executed on the processor, performs an operation of applying a patch by concurrently loading a plurality of new modules while code of a plurality of modules of an original computer program is loaded and executed on a computer system, the operation comprising:

allocating a module thread local storage (TLS) block for each thread within an initial computer program, wherein the allocated module TLS blocks are large enough to hold all module thread variables that are loaded or to be loaded, and wherein the module TLS blocks are allocated consecutively, with the same layout for each thread;

reserving spare areas between the module TLS blocks for adding new module thread variables; and arranging at an end of the module TLS blocks a thread data template section for resetting threads or creating new threads.

18. The data processing system of claim 17, wherein the operation further comprises loading the plurality of new modules by replacing one or more of the plurality of modules of the original computer program with the plurality of new modules, and wherein the loading step comprises:

determining which of the plurality of modules of the original computer program are to be replaced by the plurality of new modules;

initiating a dependency resolution process with respect to the modules to be replaced;

for each of the modules to be replaced, copying sections of each of the plurality of new modules to reserved memory sections of the computer system;

for each of the modules to be replaced, relocating all symbols and adding new static data variables and their initialization routines;

upon determining that there is no additional module to be replaced, bringing the computer system into a state where temporary data are irrelevant, wherein the temporary data include variables stored in a stack that are allocated as kernel thread variables;

relocating a global data section;

executing all initialization routines in the context of the code of the plurality of modules of the original computer program;

switching from the code of the plurality of modules of the original computer program to new code reflecting the plurality of new modules; and executing all initialization routines in the context of the new code.

19. The data processing system of claim 17, wherein the operation further comprises copying a TLS data segment from one module TLS block among the module TLS blocks to other module TLS blocks among the module TLS blocks.

20. The data processing system of claim 17, wherein the operation further comprises providing constant offsets between module TLS block pointers corresponding to the module TLS blocks and the module thread variables for all of the threads.

* * * * *